United States Patent
Etou et al.

(10) Patent No.: US 12,254,493 B2
(45) Date of Patent: Mar. 18, 2025

(54) MARKETING SUPPORT APPARATUS, SYSTEM, AND METHOD, AND NON-TRANSITORY COMPUTER READABLE MEDIUM

(71) Applicant: NEC Corporation, Tokyo (JP)

(72) Inventors: Yoshiyuki Etou, Tokyo (JP); Wataru Itonaga, Tokyo (JP); Daisuke Matsuda, Tokyo (JP); Yoji Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/268,713

(22) PCT Filed: Dec. 25, 2020

(86) PCT No.: PCT/JP2020/048943
§ 371 (c)(1),
(2) Date: Jun. 21, 2023

(87) PCT Pub. No.: WO2022/137561
PCT Pub. Date: Jun. 30, 2022

(65) Prior Publication Data
US 2024/0062247 A1 Feb. 22, 2024

(51) Int. Cl.
*G06Q 30/0251* (2023.01)
(52) U.S. Cl.
CPC ................ *G06Q 30/0269* (2013.01)
(58) Field of Classification Search
CPC .................................................. G06Q 30/0269
See application file for complete search history.

(56) References Cited

U.S. PATENT DOCUMENTS

| | | | | |
|---|---|---|---|---|
| 11,151,564 | B2 * | 10/2021 | Hutchinson | G06F 7/00 |
| 2016/0321610 | A1 * | 11/2016 | Stein | G06Q 20/4014 |
| 2018/0300506 | A1 * | 10/2018 | Kawakami | G16H 10/60 |
| 2019/0089711 | A1 * | 3/2019 | Faulkner | H04L 63/1433 |
| 2021/0173854 | A1 * | 6/2021 | Wilshinsky | G06F 16/285 |

FOREIGN PATENT DOCUMENTS

| | | |
|---|---|---|
| JP | 2005-346248 A | 12/2005 |
| JP | 2012-048360 A | 3/2012 |
| JP | 2015-108934 A | 6/2015 |
| WO | 2020/004139 A1 | 1/2020 |

OTHER PUBLICATIONS

International Search Report for PCT Application No. PCT/JP2020/048943, mailed on Mar. 30, 2021.
Toshinori Araki, Jun Furukawa, Yehuda Lindell, Ariel Nof and Kazuma Ohara, "High-Throughput Semi-Honest Secure Three-Party Computation with an Honest Majority", Proceedings of the 2016 ACM SIGSAC, Conference on Computer and Communications Security, Oct. 2016, pp. 805-817.

* cited by examiner

*Primary Examiner* — Azam A Ansari

(57) ABSTRACT

A marketing support apparatus includes: a registration unit that registers, in a first database, concealed data obtained by concealing customer information acquired from a customer information management apparatus, an acquisition unit that acquires, from a predetermined business operator, a calculation logic for calculating an evaluation value indicating a degree of a potential customer based on the customer information, a calculation unit that calculates the evaluation value from the concealed data using the calculation logic, and an output unit that outputs output information based on the evaluation value.

4 Claims, 11 Drawing Sheets

212a

| CUSTOMER ID | 01 | 02 | 03 |
|---|---|---|---|
| AGE | 25 | 35 | 55 |
| WHETHER OR NOT OWN HOUSE | NOT OWN | NOT OWN | OWN |
| FAMILY STRUCTURE | 3 | 4 | 2 |
| YEARS OF RESIDENCE | 3 | 5 | 30 |
| ADDRESS | SHINAGAWA WARD | SUGINAMI WARD | SETAGAYA WARD |
| WORKPLACE | X COMPANY | Y COMPANY | Z COMPANY |
| PLACE OF EMPLOYMENT | MINATO WARD | MINATO WARD | SHINJUKU WARD |
| YEARS OF SERVICE | 3 | 5 | 36 |
| ANNUAL INCOME (TEN THOUSAND [YEN]) | 500 | 700 | 300 |
| DEPOSIT BALANCE (TEN THOUSAND [YEN]) | 100 | 200 | 2,000 |

| COMPONY NAME | | X COMPANY | Y COMPANY | Z COMPANY |
|---|---|---|---|---|
| AVERAGE ANNULAR INCOME (TEN THOUSAND [YEN]) | 25 YEARS OLD | 450 | 600 | 350 |
| | 35 YEARS OLD | 650 | 700 | 500 |
| | 45 YEARS OLD | 850 | 800 | 700 |
| | 55 YEARS OLD | 500 | 400 | 300 |
| COMPANY COEFFICIENT | | 100 | 80 | 70 |

Fig. 11

MARKETING SUPPORT APPARATUS, SYSTEM, AND METHOD, AND NON-TRANSITORY COMPUTER READABLE MEDIUM

This application is a National Stage Entry of PCT/JP2020/048943 filed on Dec. 25, 2020, the contents of all of which are incorporated herein by reference, in their entirety.

TECHNICAL FIELD

The present invention relates to a marketing support apparatus, system, and method, and a non-transitory computer readable medium, and more particularly, to a marketing support apparatus, system, and method, and a non-transitory computer readable medium for supporting digital marketing using concealed customer information.

BACKGROUND ART

There is a demand for creation of business opportunities by digital marketing in various industry types. Here, in order to perform the digital marketing, it is effective to approach a customer having a higher advertising effect by utilizing customer information (personal information or the like). Meanwhile, there are legal restrictions, and in many cases, a third party (business operator or the like) cannot freely use personal information.

Patent Literature 1 discloses a technique related to an advertisement distribution system for distributing an advertisement suitable for an attribute of a user without allowing an advertisement distribution business operator to know personal information. Patent Literature 2 discloses a technique related to an information mediation method for anonymizing personal information and enabling use of a part of the personal information by various service providers. Non Patent Literature 1 discloses a technique related to secret calculation using secret distribution.

CITATION LIST

Patent Literature

Patent Literature 1: Japanese Unexamined Patent Application Publication No. 2015-108934
Patent Literature 2: Japanese Unexamined Patent Application Publication No. 2005-346248

Non Patent Literature

Non Patent Literature 1: Toshinori Araki, Jun Furukawa, Yehuda Lindell, Ariel Nof and Kazuma Ohara, High-Throughput Semi-Honest Secure Three-Party Computation with an Honest Majority, Proceedings of the 2016 ACM SIGSAC, Conference on Computer and Communications Security, October 2016, Pages 805-817

SUMMARY OF INVENTION

Technical Problem

Here, the technology according to Patent Literature 1 specifies an individual having an attribute that satisfies a condition given from the outside and notifies the specified individual to an advertisement distribution business operator, but there is a problem that a degree of satisfying the condition is unknown and detailed marketing cannot be performed. Note that Patent Literature 2 and Non Patent Literature 1 also cannot solve such a problem.

The present disclosure has been made to solve such a problem, and an object of the present disclosure is to provide a marketing support apparatus, system, and method, and a non-transitory computer readable medium for supporting creation of a business opportunity utilizing customer information while considering privacy of a customer when a holder of the customer information and a marketing entity are different.

Solution to Problem

According to a first aspect of the present disclosure, there is provided a marketing support apparatus including: a registration means for registering, in a first database, concealed data obtained by concealing customer information acquired from a customer information management apparatus;
   an acquisition means for acquiring, from a predetermined business operator, a calculation logic for calculating an evaluation value indicating a degree of a potential customer based on the customer information;
   a calculation means for calculating the evaluation value from the concealed data using the calculation logic; and
   an output means for outputting output information based on the evaluation value.

According to a second aspect of the present disclosure, there is provided a marketing support system including:
   a customer information management apparatus configured to manage customer information; and
   a marketing support apparatus,
   in which the marketing support apparatus includes
   a registration means for registering, in a first database, concealed data obtained by concealing the customer information acquired from the customer information management apparatus,
   an acquisition means for acquiring, from a predetermined business operator, a calculation logic for calculating an evaluation value indicating a degree of a potential customer based on the customer information,
   a calculation means for calculating the evaluation value from the concealed data using the calculation logic, and
   an output means for outputting output information based on the evaluation value.

According to a third aspect of the present disclosure, there is provided a marketing support method causes a computer to execute:
   acquiring customer information from a customer information management apparatus;
   registering, in a first database, concealed data obtained by concealing the acquired customer information;
   acquiring, from a predetermined business operator, a calculation logic for calculating an evaluation value indicating a degree of a potential customer based on the customer information;
   calculating the evaluation value from the concealed data using the calculation logic; and
   outputting output information based on the evaluation value.

According to a fourth aspect of the present disclosure, there is provided a non-transitory computer readable medium storing a program for causing a computer to execute:
   an acquisition process of acquiring customer information from a customer information management apparatus;

a registration process of registering, in a first database, concealed data obtained by concealing the acquired customer information;

an acquisition process of acquiring, from a predetermined business operator, a calculation logic for calculating an evaluation value indicating a degree of a potential customer based on the customer information;

a calculation process of calculating an evaluation value from the concealed data using the calculation logic; and an output process of outputting output information based on the evaluation value.

Advantageous Effects of Invention

According to the present disclosure, it is possible to provide a marketing support apparatus, system, and method, and a non-transitory computer readable medium for supporting creation of a business opportunity utilizing customer information while considering privacy of a customer when a holder of the customer information and a marketing entity are different.

BRIEF DESCRIPTION OF DRAWINGS

FIG. 10 is a diagram illustrating an example of customer financial asset information according to the third example embodiment.

FIG. 11 is a diagram illustrating an example of company information according to the third example embodiment.

EXAMPLE EMBODIMENTS

Figure 1:
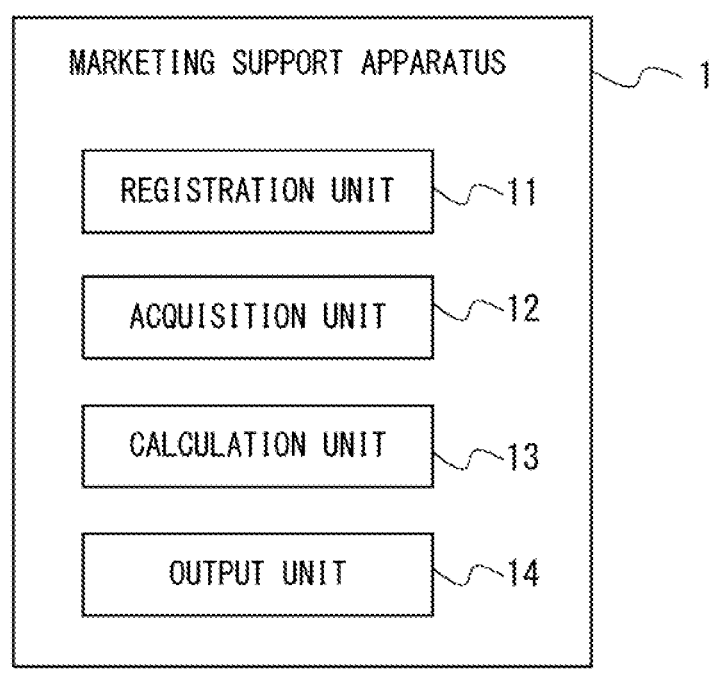
FIG. 1 is a block diagram illustrating a configuration of a marketing support apparatus according to a first example embodiment.

Hereinafter, example embodiments of the present disclosure will be described in detail with reference to the drawings. In the drawings, the same or corresponding elements are denoted by the same reference numerals, and repeated description is omitted as necessary for clarity of description.

First Example Embodiment

FIG. 1 is a block diagram illustrating a configuration of a marketing support apparatus 1 according to a first example embodiment. The marketing support apparatus 1 is an information processing apparatus for supporting digital marketing using concealed customer information. Here, the marketing support apparatus 1 is connected to a customer information management apparatus (not illustrated) and a terminal (not illustrated) of a predetermined business operator via a communication network (not illustrated, hereinafter, the communication network is also simply referred to as a network). Note that the network does not matter whether it is wired or wireless, and does not matter whether it is a type of communication protocol. The customer information management apparatus is an information processing apparatus operated by an organization (company or the like) that manages customer information including personal information and sensitive information (sensing information) in a customer of an individual or a company. It is assumed that the customer information management apparatus registers customer information in a storage device such as a database. In addition, it is assumed that the customer information management apparatus provides the customer information to the marketing support apparatus 1 after obtaining the customer's consent to concealment of the customer information and utilization of the customer information for digital marketing. In addition, the business operator wants to create a business opportunity using concealed customer information.

The marketing support apparatus 1 includes a registration unit 11, an acquisition unit 12, a calculation unit 13, and an output unit 14. The registration unit 11 registers, in a first database, concealed data obtained by concealing customer information acquired from the customer information management apparatus. Here, the concealment refers to predetermined processing for protecting a data content against external access. The concealment includes division of data by encryption or secret distribution. Furthermore, the concealment may include anonymization of personal information. The first database is a database system for storing the concealed data. The first database may be implemented by a storage device (not illustrated) built in the marketing support apparatus 1. Alternatively, the first database may be implemented by one or more database servers connected to the marketing support apparatus 1 via a network.

The acquisition unit 12 acquires a predetermined calculation logic from (a terminal of) a predetermined business operator. The calculation logic is information for calculating an evaluation value indicating a degree of a potential customer based on the customer information. For example, the calculation logic may be definition information of an arithmetic expression using a plurality of element data included in the customer information of one customer. The evaluation value (score) is a numerical value or a level value.

The calculation unit 13 calculates the evaluation value from the concealed data using the calculation logic. For example, the calculation unit 13 may obtain the evaluation value by acquiring the concealed data corresponding to the element data defined in the calculation logic from the first database and performing the operation defined in the calculation logic using the acquired concealed data. Alternatively, the calculation unit 13 may instruct the first database to perform an operation on the element data defined in the calculation logic and acquire the operation result as the evaluation value. In addition, the calculation unit 13 may instruct the first database to perform an operation of a part of the calculation logic and obtain the evaluation value by performing the remaining operation of the calculation logic using the operation result acquired from the first database. Note that the calculation unit 13 calculates an evaluation value for each customer. In addition, the calculation unit 13 may calculate the evaluation value from the concealed data by secret calculation. As a result, the evaluation value based on the calculation logic can be obtained without decoding the concealed data. Note that, for the secret calculation, for example, a method using secret distribution, a method using homomorphic encryption, or a method using hardware can be used. The method using the secret distribution may be, for example, the method of Non Patent Literature 1 described above. The method using hardware may use Trusted Execution Environment or the like.

The output unit 14 outputs output information based on the evaluation value. Here, the output information may be a set of the calculated evaluation value and customer identification information corresponding to the evaluation value. As a result, it is possible to easily grasp that a customer having a relatively high evaluation value has a high possibility of being a potential customer, and a customer having a relatively low evaluation value has a low possibility of being a potential customer. In particular, the business operator can not only determine whether or not the customer is the potential customer based on the magnitude of the evaluation value with respect to a threshold, but also grasp the degree of the potential customer based on the evaluation value.

Note that the output unit 14 may output distribution information of evaluation values for a plurality of customers as output information. The distribution information is, for example, statistical information such as the number of customers for each evaluation value. As a result, for example, the business operator can grasp the tendency of the customer managed by the customer information management apparatus even when the specific sensitive information of the customer is unknown.

The output unit 14 preferably outputs the output information to the customer information management apparatus. As a result, the customer information management apparatus can grasp the evaluation value or the distribution information for each customer. Then, in response to an instruction from the business operator, an advertisement or the like can be made to the customer satisfying the condition of the evaluation value. Alternatively, the output unit 14 may output the output information to the business operator. For example, when the output information is the set of the evaluation value and the customer identification information, the business operator can select the customer identification information that satisfies the condition of the evaluation value, and request the customer information management apparatus to advertise the selected customer identification information. In addition, when the output information is the distribution information of the evaluation values, the business operator can easily determine the threshold and the condition of the evaluation value to be the advertisement target.

Figure 2:
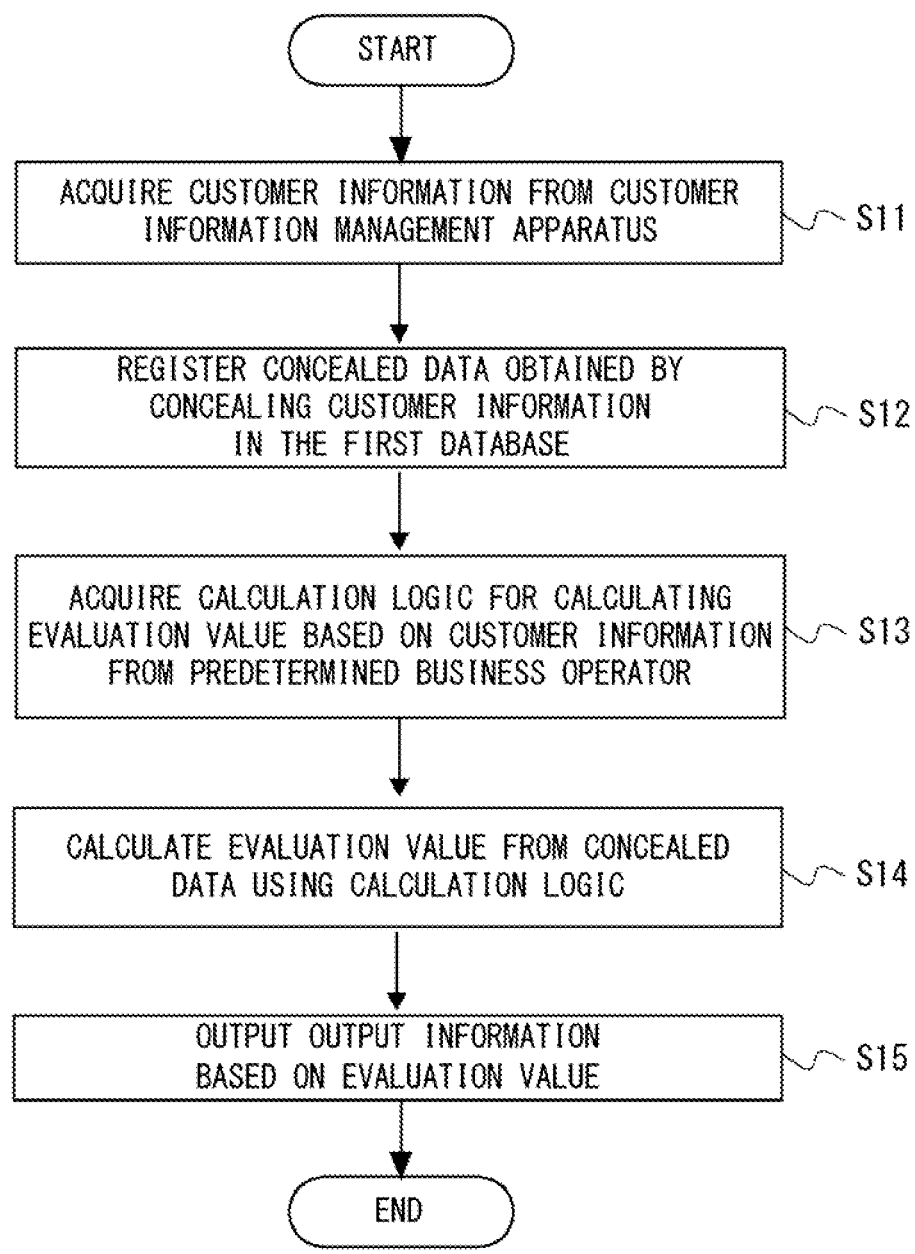
FIG. 2 is a flowchart illustrating a flow of a marketing support method according to the first example embodiment.

FIG. 2 is a flowchart illustrating a flow of a marketing support method according to the first example embodiment. First, the registration unit 11 acquires the customer information from the customer information management apparatus (S11). Next, the registration unit 11 registers, in the first database, the concealed data obtained by concealing the customer information acquired in Step S11 (S12). Then, the acquisition unit 12 acquires, from a predetermined business operator, the calculation logic for calculating the evaluation value indicating the degree of the potential customer based on the customer information (S13). Subsequently, the calculation unit 13 calculates the evaluation value from the concealed data using the calculation logic acquired in Step S13 (S14). Thereafter, the output unit 14 outputs output information based on the evaluation value (S15).

As described above, since the marketing support apparatus 1 according to the present example embodiment outputs the output information based on the evaluation value, the customer information management apparatus or the business operator can grasp the degree of the potential customer. Therefore, it is possible to support detailed marketing. The customer information itself managed by the customer information management apparatus is not disclosed to the business operator. That is, when a holder of the customer information is different from a marketing entity (business operator), it is possible to support creation of a business opportunity utilizing the customer information while considering privacy of the customer.

Note that the marketing support apparatus 1 includes a processor, a memory, and a storage device as components (not illustrated). In addition, the storage device stores a computer program in which the processing of the marketing support method according to the present example embodiment is implemented. Then, the processor reads a computer program from the storage device into the memory, and executes the computer program. As a result, the processor implements the functions of the registration unit 11, the acquisition unit 12, the calculation unit 13, and the output unit 14.

Alternatively, each of the registration unit 11, the acquisition unit 12, the calculation unit 13, and the output unit 14 may be implemented by dedicated hardware. In addition, some or all of the components of each device may be implemented by general-purpose or dedicated circuitry, a processor, or the like, or a combination thereof. These may be configured by a single chip or may be configured by a plurality of chips connected via a bus. Some or all of components of each device may be implemented by a combination of the above-described circuit or the like and a program. Furthermore, as the processor, a central processing unit (CPU), a graphics processing unit (GPU), a field-programmable gate array (FPGA), a quantum processor (quantum computer control chip), or the like can be used.

Furthermore, in a case where some or all of the components of the marketing support apparatus 1 are implemented by a plurality of information processing apparatuses, circuits, and the like, the plurality of information processing apparatuses, circuits, and the like may be arranged in a centralized manner or in a distributed manner. For example, the information processing apparatus, the circuit, and the like may be implemented as a form in which each is connected via a communication network, such as a client server system and a cloud computing system. Furthermore, the function of the marketing support apparatus 1 may be provided in a software as a service (SaaS) format.

Second Example Embodiment

A second example embodiment is a specific example of the first example embodiment described above. The marketing support system 1000 includes a customer terminal 100, a customer information management apparatus 200, a business terminal 300, and a marketing support apparatus 400. The customer terminal 100, the customer information management apparatus 200, the business terminal 300, and the marketing support apparatus 400 are connected via a network N. Here, the network N is a wired or wireless communication line, for example, the Internet.

A customer U1 is a user to be managed by the customer information management organization that operates the customer information management apparatus 200. The customer U1 is, for example, an individual or an employee of a company. The customer terminal 100 is an information terminal operated by the customer U1. The customer terminal 100 is, for example, a mobile phone terminal, a smartphone, a tablet terminal, a personal computer, or the like. The customer terminal 100 transmits a registration request of the customer information to the customer information management apparatus 200 via the network N according to the operation of the customer U1. Here, the customer information includes personal information such as a profile of a customer, transaction information, and the like. In addition, the customer terminal 100 transmits, to the customer information management apparatus 200 via the network N, a principal consent for data concealment and utilization of the registered customer information. Further, the customer terminal 100 receives an advertisement or a product proposal from the customer information management apparatus 200 via the network N, and displays the received advertisement or proposal content on the screen. The customer terminal 100 transmits the application for the proposal content and the disclosure agreement of the personal information to the customer information management apparatus 200 via the network N according to the operation of the customer U1. The customer terminal 100 performs contract conclusion processing of proposal contents with the business operator via the customer information management apparatus 200 as necessary.

The customer information management apparatus 200 is an information processing apparatus operated by an organization that manages customer information of a customer including the customer U1. The customer information management apparatus 200 may be redundant in a plurality of servers, and each functional block may be implemented by a plurality of computers.

Figure 4:
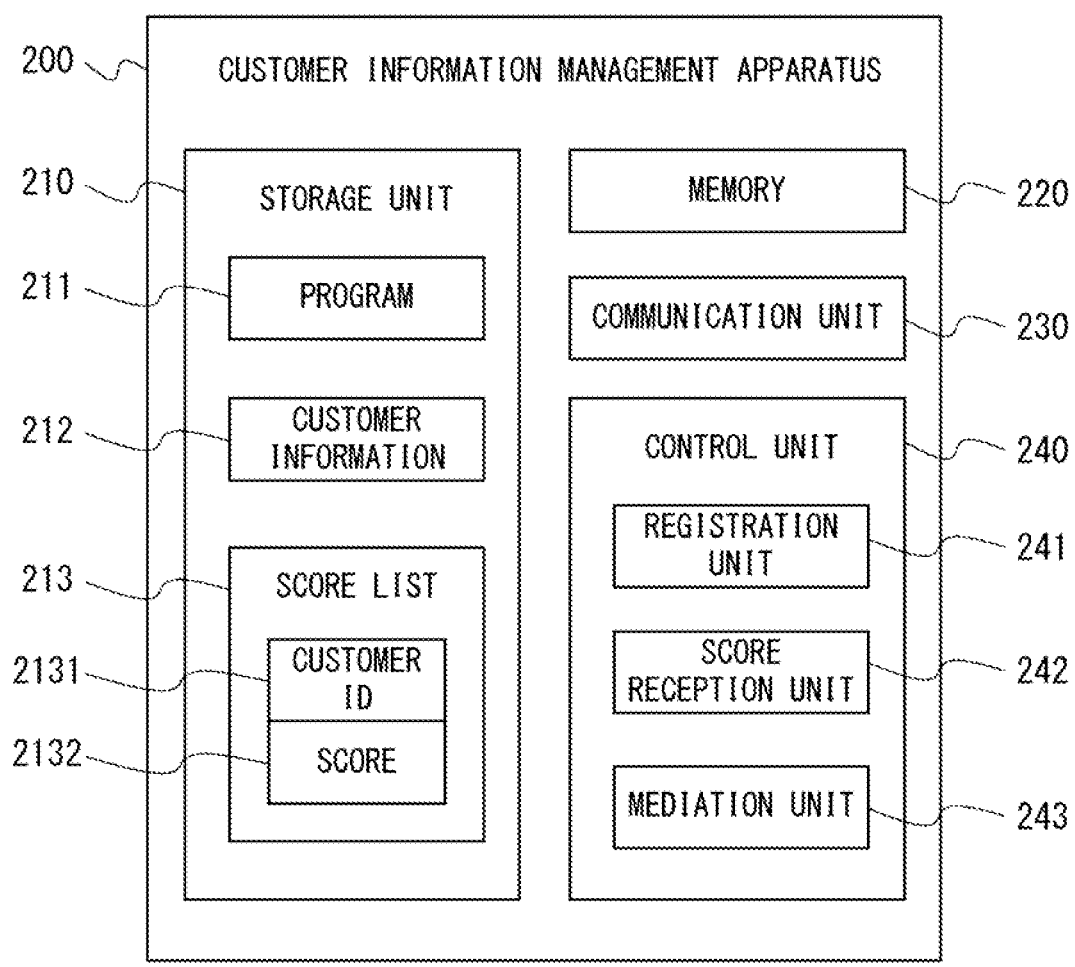
FIG. 4 is a block diagram illustrating a configuration of a customer information management apparatus according to the second example embodiment.

FIG. 4 is a block diagram illustrating a configuration of the customer information management apparatus 200 according to the second example embodiment. The customer information management apparatus 200 includes a storage unit 210, a memory 220, a communication unit 230, and a control unit 240. The storage unit 210 stores a program 211, customer information 212, and a score list 213. A program 211 is a computer program in which the processing of the customer information management apparatus 200 is implemented in the marketing support method according to the second example embodiment.

In the customer information 212, personal information and sensitive information are associated with the customer identification information. The customer information 212 includes a contact address (for example, an e-mail address, an address, a telephone number, or the like) of the customer. Note that the customer information 212 may include information regarding financial assets of the customer and a history of various transactions including financial products. The score list 213 is a set of a customer ID 2131 and a score 2132 for one or more customers. The customer ID 2131 is an example of the customer identification information. The score 2132 is an example of an evaluation value calculated by the marketing support apparatus 400 as described later.

The memory 220 is a volatile storage device such as a random access memory (RAM), and is a storage area for temporarily holding information during the operation of the control unit 240. The communication unit 230 is a communication interface with the network N.

The control unit 240 is a processor that controls each component of the customer information management apparatus 200, that is, a control device. The control unit 240 reads a program 211 from the storage unit 210 into the memory 220 and executes the program 211. As a result, the control unit 240 implements the functions of a registration unit 241, a score reception unit 242, and a mediation unit 243.

The registration unit 241 registers the customer information 212 received from the customer terminal 100 in the storage unit 210. In addition, the registration unit 241 transmits a concealment request including the customer information 212 of the customer U1 to the marketing support apparatus 400 in response to the principal consent on the concealment and utilization of the data received from the customer terminal 100. When additionally receiving a history of the transaction information from the customer terminal 100, the registration unit 241 adds and updates the history of the transaction information to the corresponding customer information 212.

The score reception unit 242 receives the score list 213 from the marketing support apparatus 400 as output information, and stores the score list 213 in the storage unit 210.

The mediation unit 243 receives the proposal content and a condition of a score of a proposal target person from the business terminal 300. Then, the mediation unit 243 specifies the contact address of the customer who is the proposal target person from the customer information 212 based on the score list 213 and the score condition. The mediation unit 243 transmits the proposal content to the specified contact address. When accepting the acceptance of the proposal content from the customer who is a transmission destination of the proposal content, the mediation unit 243 transmits the acceptance and customer information 2112 corresponding to the customer to the business terminal 300. Then, the mediation unit 243 mediates a contract conclusion between the business terminal 300 and the customer terminal 100. After the contract is concluded, the mediation unit 243 receives payment of a contract fee from the business terminal 300. For example, in a case where the customer information management organization is a financial institution, the mediation unit 243 receives a remittance request of a contract fee from the account of the business operator to the account of the customer information management organization from the business terminal 300, and executes remittance processing between the accounts. Alternatively, the mediation unit 243 may receive a remittance report of the contract fee from the business terminal 300. Furthermore, the mediation unit 243 may receive transaction information based on a transaction between the customer U1 after the contract conclusion and the business operator from the business terminal 300. In that case, the mediation unit 243 adds the received transaction information to the customer information 212 of the customer U1.

Figure 3:
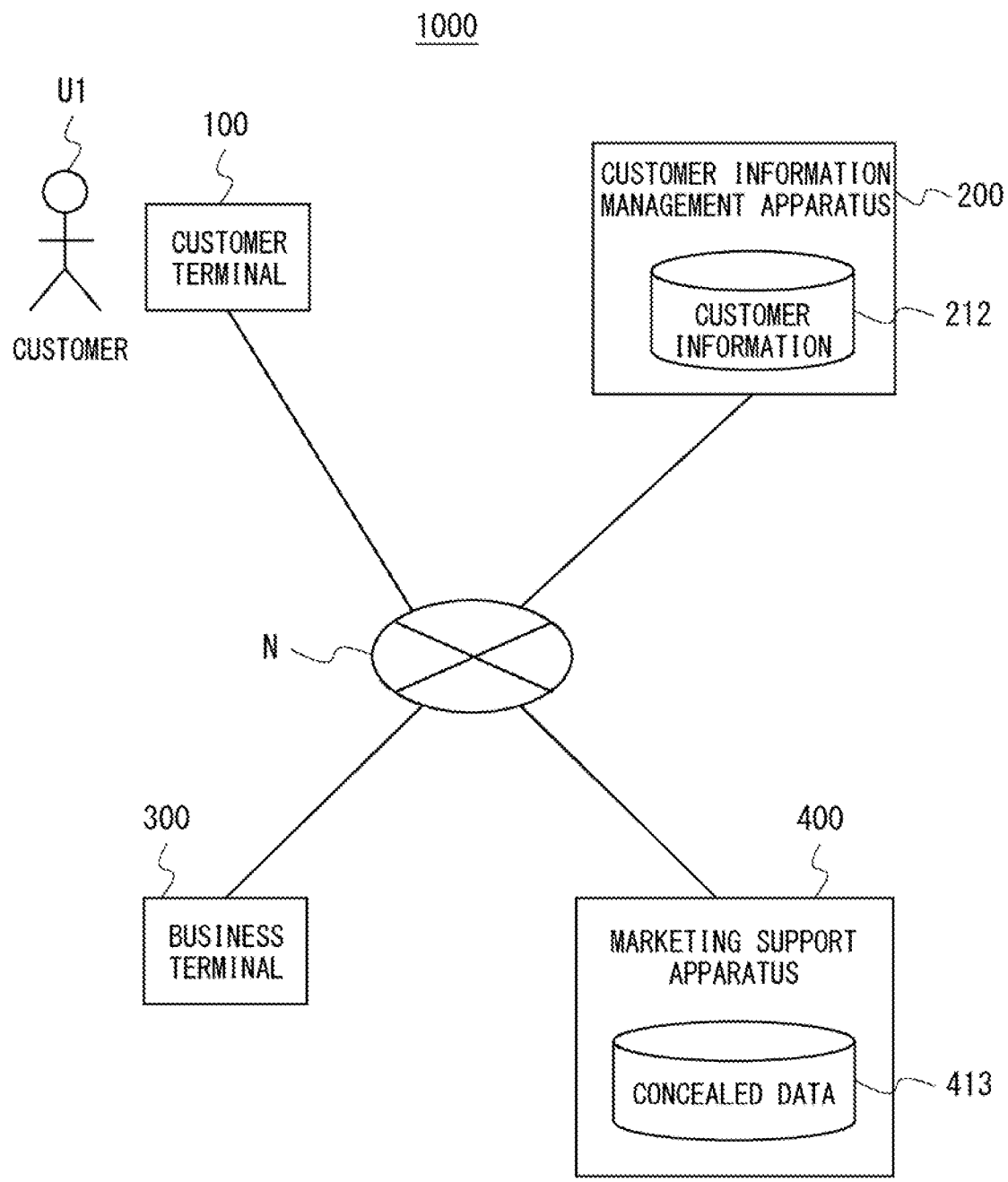
FIG. 3 is a block diagram illustrating an overall configuration of a marketing support system according to a second example embodiment.

Returning to FIG. 3, the description will be continued. The business terminal 300 is an information terminal operated by (a person in charge of) the business operator that performs the digital marketing based on concealed data 413 obtained by concealing the customer information 212 managed by the customer information management apparatus 200. The business operator can be said to be a person who wants to create business opportunities. The business terminal 300 is a mobile phone terminal, a smartphone, a tablet terminal, a personal computer, a computer server, or the like. The business terminal 300 transmits a calculation logic for calculating a score from the concealed data 413 to the marketing support apparatus 400. The calculation logic is information defining an arithmetic expression using each element data of the customer information 212. That is, the score is the operation result of the arithmetic expression defined in the calculation logic. Note that the business terminal 300 may acquire the score list from the marketing support apparatus 400.

In addition, the business terminal 300 transmits the proposal content to the customer managed by the customer information management organization and the condition of the score of the proposal target person to the customer information management apparatus 200. When the customer who is the proposal target person accepts the proposal content, the business terminal 300 receives the acceptance and the customer information corresponding to the customer from the customer information management apparatus 200. In response to this, the business operator may conclude the contract with the accepted customer. At that time, the business terminal 300 may perform the contract conclusion processing with the customer terminal 100 via the customer information management apparatus 200 according to the operation of the business operator. Further, the business terminal 300 may pay the contract fee to the customer information management apparatus 200 after the contract conclusion. For example, when the customer information management organization is a financial institution, the business terminal 300 transmits the remittance request of the contract fee from the account of the business operator to the account of the customer information management organization. Alternatively, the business terminal 300 transmits a remittance report of the contract fee to the customer information management apparatus 200. Further, the business terminal 300 may transmit transaction information based on a transaction between the customer U1 after the contract conclusion and the business operator to the customer information management apparatus 200.

Figure 5:
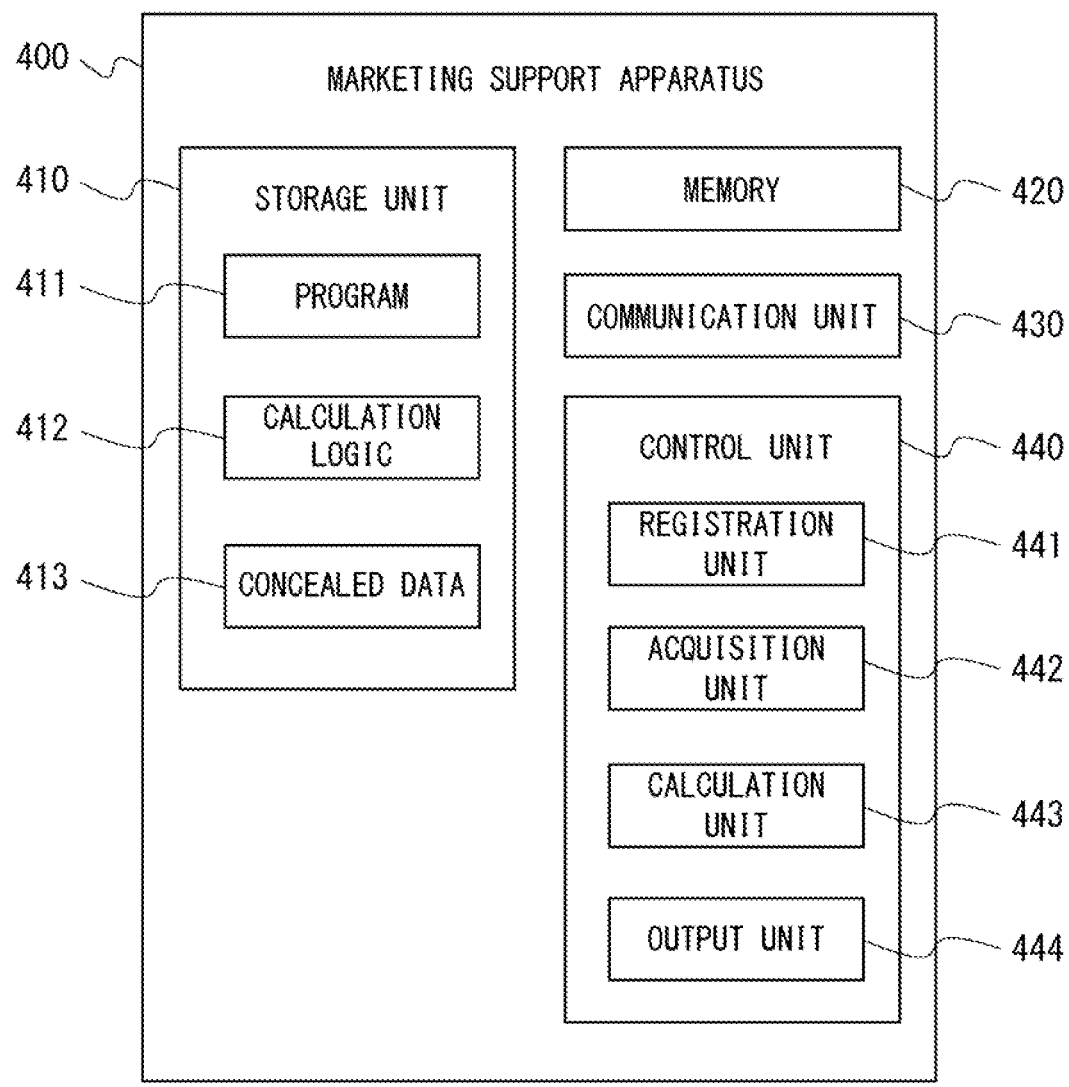
FIG. 5 is a block diagram illustrating a configuration of a marketing support apparatus according to the second example embodiment.

Returning to FIG. 3, the description will be continued. The marketing support apparatus 400 is an example of the marketing support apparatus 1 described above. FIG. 5 is a block diagram illustrating a configuration of the marketing support apparatus 400 according to the second example embodiment. The marketing support apparatus 400 includes a storage unit 410, a memory 420, a communication unit 430, and a control unit 440. The storage unit 410 stores a program 411, a calculation logic 412, and a concealed data 413. The program 411 is a computer program in which the processing of the marketing support apparatus 400 is implemented in the marketing support method according to the second example embodiment.

The calculation logic 412 is a calculation logic received from the business terminal 300.

The concealed data 413 is data obtained by concealing the customer information 212 acquired from the customer information management apparatus 200.

The memory 420 is a volatile storage device such as a random access memory (RAM), and is a storage area for temporarily holding information during the operation of the control unit 440. The communication unit 430 is a communication interface with the network N.

The control unit 440 is a processor that controls each component of the marketing support apparatus 400, that is, a control device. The control unit 440 reads the program 411 from the storage unit 410 into the memory 420 and executes the program 411. As a result, the control unit 440 implements the functions of the registration unit 441, the acquisition unit 442, the calculation unit 443, and the output unit 444.

The registration unit 441 is an example of the registration unit 11 described above. The registration unit 441 conceals the customer information 212 acquired from the customer information management apparatus 200. For example, the registration unit 441 encrypts the customer information 212. Alternatively, the registration unit 441 performs processing such as division of data by secret distribution on the customer information 212. Then, the registration unit 441 registers the concealed data 413 in the storage unit 410.

The acquisition unit 442 is an example of the acquisition unit 12 described above. The acquisition unit 442 acquires the calculation logic 412 from the business terminal 300 and registers the calculation logic 412 in the storage unit 410.

The calculation unit 443 is an example of the above-described calculation unit 13. The calculation unit 443 calculates a score from the concealed data 413 using the calculation logic 412. The calculation unit 443 performs score calculation processing for each customer according to an instruction or set timing from the administrator. The calculation unit 443 reads the concealed data 413 corresponding to the element data defined in the calculation logic 412 from the storage unit 410, and calculates the score of the target customer by the arithmetic expression defined in the calculation logic 412. The calculation unit 443 may calculate the score by secret calculation. That is, the calculation unit 443 may calculate the score without decoding the concealed data 413.

The output unit 444 is an example of the output unit 14 described above. The output unit 444 generates a score list from a set of the score calculated by the calculation unit 443 for each customer and the customer ID corresponding to the score, and transmits the score list to the customer information management apparatus 200. Note that the output unit 444 may transmit the score list to the business terminal 300. Alternatively, the output unit 444 may transmit the score list to both the customer information management apparatus 200 and the business terminal 300.

Figure 6:
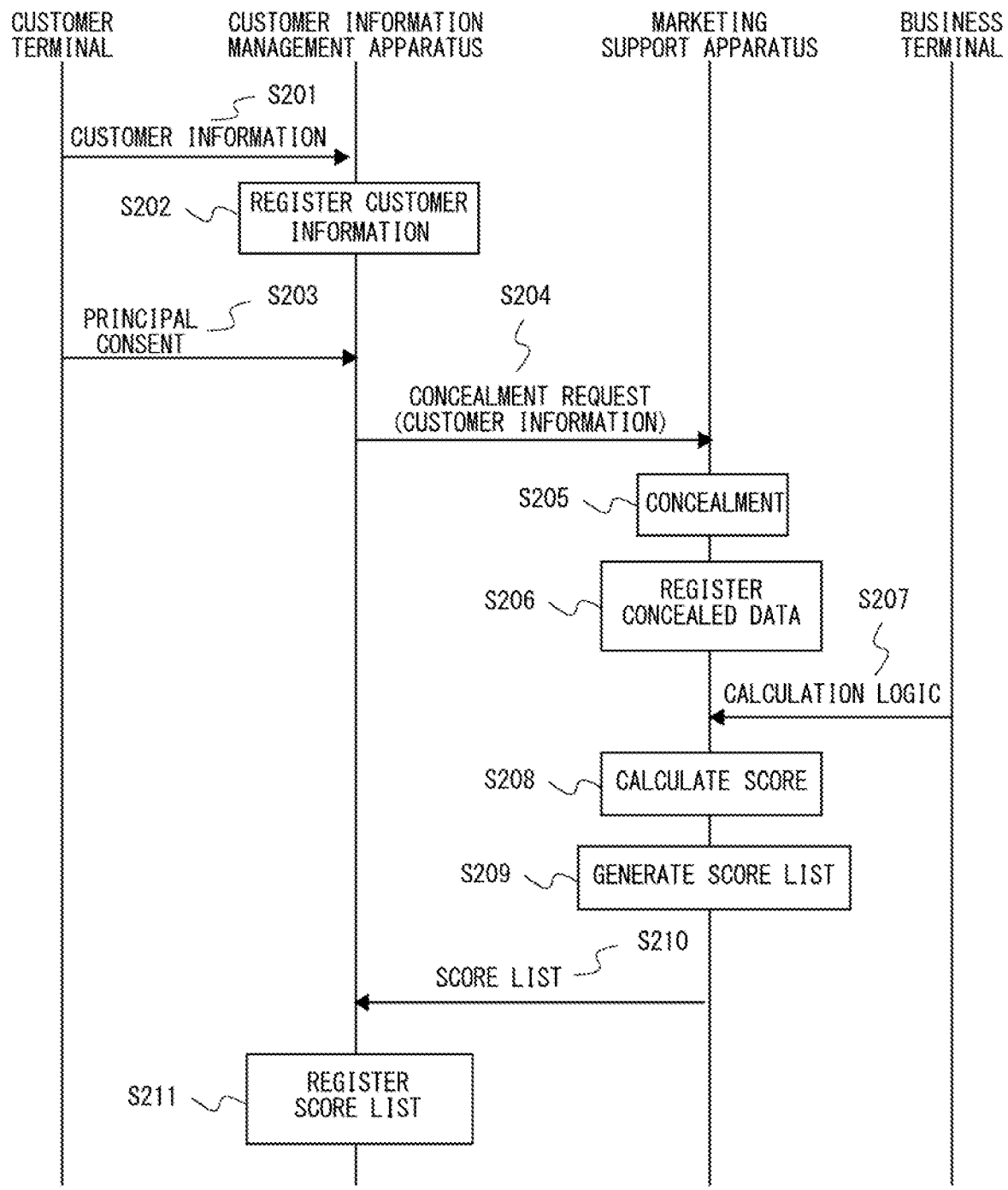
FIG. 6 is a sequence diagram illustrating a flow of a marketing support method according to the second example embodiment.
Figure 7:
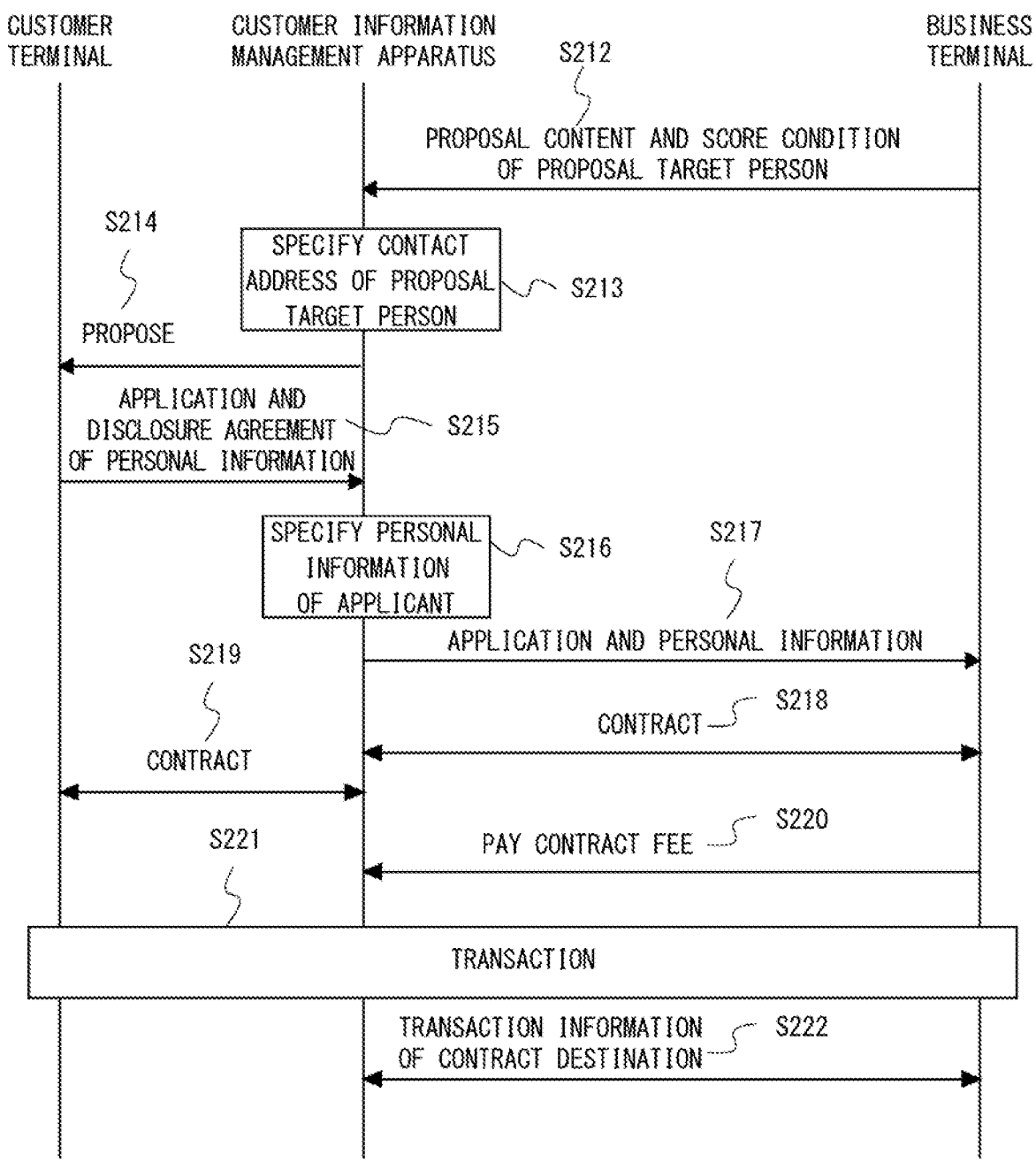
FIG. 7 is a sequence diagram illustrating the flow of the marketing support method according to the second example embodiment.

FIGS. 6 and 7 are sequence diagrams illustrating the flow of a marketing support method according to the second example embodiment. First, the customer terminal 100 transmits a registration request of the customer information to the customer information management apparatus 200 via the network N according to the operation of the customer U1 (S201). In response to this, the registration unit 241 of the customer information management apparatus 200 receives the customer information 212 from the customer terminal 100, and registers the customer information 212 in the storage unit 210 (S202). Here, the customer information 212 includes customer identification information, the contact address, other personal information, and the sensitive information.

Subsequently, in response to the operation of the customer U1, the customer terminal 100 transmits, to the customer information management apparatus 200 via the network N, the principal consent on concealment and utilization of the data regarding the registered customer information (S203). In response to this, the registration unit 241 receives the principal consent from the customer terminal 100. Then, the registration unit 241 transmits the concealment request including the customer information 212 of the customer U1 to the marketing support apparatus 400 via the network N in response to the reception of the principal consent (S204).

In response to this, the registration unit 441 of the marketing support apparatus 400 receives the concealment request from the customer information management apparatus 200. Then, the registration unit 441 conceals the personal information included in the received concealment request (S205). Subsequently, the registration unit 441 registers the concealed data 413 in the storage unit 410 (S206).

In addition, the business terminal 300 transmits the calculation logic to the marketing support apparatus 400 via the network N according to the operation of the person in charge of the business operator (S207). Step S207 may be executed before Step S201. Alternatively, Step S207 may be executed between Steps S201 and S206.

In response to Step S207, the acquisition unit 442 of the marketing support apparatus 400 receives the calculation logic 412 from the business terminal 300 and registers the calculation logic 412 in the storage unit 410.

Thereafter, the calculation unit 443 calculates a score for each customer (S208). That is, the calculation unit 443 reads the calculation logic 412 from the storage unit 410 at a predetermined timing, and calculates a score based on the calculation logic 412 from the concealed data 413 for each customer in the concealed data 413.

Then, the output unit 444 generates the score list from the set of the score calculated for each customer and the customer ID corresponding to the score (S209). Then, the output unit 444 transmits the score list to the customer information management apparatus 200 via the network N (S210).

In response to this, the score reception unit 242 of the customer information management apparatus 200 receives (receives) the score list from the marketing support apparatus 400. Then, the score reception unit 242 registers the received score list 213 in the storage unit 210 (S211).

Thereafter, the business terminal 300 transmits the proposal content to the customer managed by the customer information management organization and the condition of the score of the proposal target person to the customer information management apparatus 200 via the network N (S212). The proposal content is, for example, advertisement information regarding a business conducted by the business operator, guidance information of a product or a service, or the like. The condition of the score of the proposal target person is, for example, a score threshold or the like. In response to this, the mediation unit 243 of the customer information management apparatus 200 receives the proposal content and the score condition from the business terminal 300, and registers the proposal content and the score condition in the storage unit 210 or the memory 220. Note that, similarly to Step S207, Step S212 may be executed before Step S201 or between Steps S201 and S206.

After Steps S211 and S212, the mediation unit 243 specifies the contact address of the customer who is the proposal target person from the customer information 212 based on the score list 213 and the score condition (S213). Here, it is assumed that the customer U1 is specified as the proposal target person and the e-mail address of the customer U1 is specified. Then, the mediation unit 243 transmits the proposal content to the customer terminal 100 of the specified customer U1 (S214). Specifically, the mediation unit 243 transmits an e-mail including the proposal content to the specified e-mail address of the customer U1. Then, the customer terminal 100 receives an e-mail including the proposal content from the customer information management apparatus 200 via a mail server (not illustrated). The customer terminal 100 displays the received e-mail on the screen. As a result, the customer U1 can confirm the proposal content (mediated by the customer information management apparatus 200) from the business operator.

Subsequently, the customer U1 accepts the proposal content and makes an application. Therefore, the customer terminal 100 transmits the application for the proposal content and the disclosure agreement of the personal information to the customer information management apparatus 200 via the network N according to the operation of the customer U1 (S215). In response to this, the mediation unit 243 of the customer information management apparatus 200 receives the application (acceptance of the proposal content) and the disclosure agreement of the personal information from the customer terminal 100, and specifies the customer information 212 (personal information and the like) corresponding to the applicant (customer U1) from the storage unit 210 (S216). Then, the mediation unit 243 transmits the fact of the application and the customer information 2112 corresponding to the customer U1 to the business terminal 300 (S217). In response to this, the business terminal 300 receives the fact of application and the customer information from the customer information management apparatus 200 and displays the fact and the information on the screen. Therefore, the business operator receives an application from the customer U1 for the proposal content made to the customer U1, and can acquire personal information and the like of the customer U1. At this time, the business terminal 300 may store the received customer information therein.

Thereafter, the business terminal 300 performs conclusion processing of the contract with the customer U1 according to the operation of the business operator. Here, the business terminal 300 transmits information indicating that the contract with the customer U1 is concluded to the customer information management apparatus 200 via the network N (S218). Then, the mediation unit 243 of the customer information management apparatus 200 transmits the conclusion of the contract received from the business terminal 300 to the customer terminal 100 via the network N (S219). In response to this, the customer terminal 100 receives the conclusion of the contract from the customer information management apparatus 200 and displays the conclusion on the screen. As a result, the customer U1 can confirm the conclusion of the contract with the business operator.

Then, after the contract is concluded, the business terminal 300 pays the contract fee to the customer information management apparatus 200 (S220). For example, when the customer information management organization is a financial institution, the business terminal 300 transmits the remittance request of the contract fee from the account of the business operator to the account of the customer information management organization. In this case, the mediation unit 243 receives the remittance request of the contract fee from the account of the business operator to the account of the customer information management organization from the business terminal 300, and executes the remittance processing between the accounts.

Thereafter, a transaction according to the contract content is performed between the customer U1 and the business operator (S221). At this time, the business terminal 300 may acquire further personal information and transaction information from the customer U1 and store them therein. Then, the business terminal 300 transmits the transaction information of the customer U1, which is a contract destination, to the customer information management apparatus 200 via the network N (S222). In response to this, the mediation unit 243 of the customer information management apparatus 200 receives the transaction information from the business terminal 300, and additionally registers the received transaction information in the customer information 212 of the customer U1.

Note that the customer information in Step S201 may be a history of transaction information of the customer. In this case, in Step S202, the registration unit 241 of the customer information management apparatus 200 updates the customer information 212 of the customer corresponding to the transaction information received from the customer terminal 100.

As described above, according to the present example embodiment, when the holder of the customer information is different from the marketing entity (business operator), it is possible to support creation of a business opportunity utilizing the customer information while considering privacy of the customer. That is, the customer information held and managed as raw data by the customer information management apparatus 200 is processed from the raw data into concealed data in the marketing support apparatus 400, stored, and managed. Therefore, it is possible to appropriately store the customer information outside the customer information management apparatus 200 and secure the security upon the agreement of the customer. Therefore, it is possible to lower a psychological barrier against personal information and concealed information of an individual or a company who is an information provider being utilized by a third party business operator. Therefore, the provision of the customer information is promoted.

In addition, the business operator who desires to create a business opportunity registers, in the marketing support apparatus 400, a scoring calculation formula (calculation logic) for highly rating a customer having an attribute that he/she desires to contact for his/her business. As a result, the business operator can also obtain output information based on the score from the marketing support apparatus 400. At this time, personal information and concealed information of the customer are minimized in the output information. For example, it is a set of customer identification information and a score. In addition, as in the present example embodiment, in a case where the output information based on the score is directly output to the customer information management apparatus 200 but not output to the business terminal 300, the business operator has no opportunity to come in contact with the customer information and the concealed data. That is, the customer information and concealed data are concealed from the business operator.

Note that, in a case where the output information is score distribution information, the customer information itself is hidden. The score distribution information is, for example, information in which 70 points are 2 persons, 90 points are 3 persons, and 95 points are 1 person, and is information in which an individual cannot be specified. However, it is desirable that the output destination of the score distribution information be a business operator.

Then, the business operator can approach the customer with a high score via the customer information management apparatus 200 by registering the proposal content and the score condition in the customer information management apparatus 200. That is, it is possible to select a customer having a high probability of being a potential customer in its own business and efficiently perform advertisement or the like without contacting with specific customer information.

Furthermore, since the scoring calculation formula is directly input from the business terminal 300 of the business operator that desires to create a business opportunity to the marketing support apparatus 400, the scoring know-how is not known to a third party including the customer information management organization. In addition, when the score list is output to the customer information management organization, there is no opportunity for a business operator who wants to create a business opportunity to know the score result. Furthermore, by contacting a customer candidate for which a high score is calculated from the customer information management organization, there is no opportunity for a business operator who desires to create a business opportunity to obtain customer information until there is a request for contact (including acceptance and application) from the customer candidate.

In addition, as described above, by sequentially adding the history of the transaction information of the customer after the new registration of the customer information, the score calculated at a certain point of time for the customer may be changed after the addition of the transaction information. That is, by updating the score, it is possible to select an optimal customer candidate according to the state of the customer at that time.

Third Example Embodiment

A third example embodiment is a specific example of the second example embodiment described above, and is applied to digital marketing for sales of real estate and financial products. The customer information in the third example embodiment includes financial information of a customer and an affiliation destination. In addition, the calculation logic includes financial information and affiliation information regarding an affiliation destination. Then, the calculation unit specifies the affiliation destination and the financial information included in the customer information from the concealed data. Then, the calculation unit specifies affiliation information corresponding to the specified affiliation destination from the calculation logic. Then, the calculation unit calculates the evaluation value using the specified financial information and the acquired affiliation information.

Figure 8:
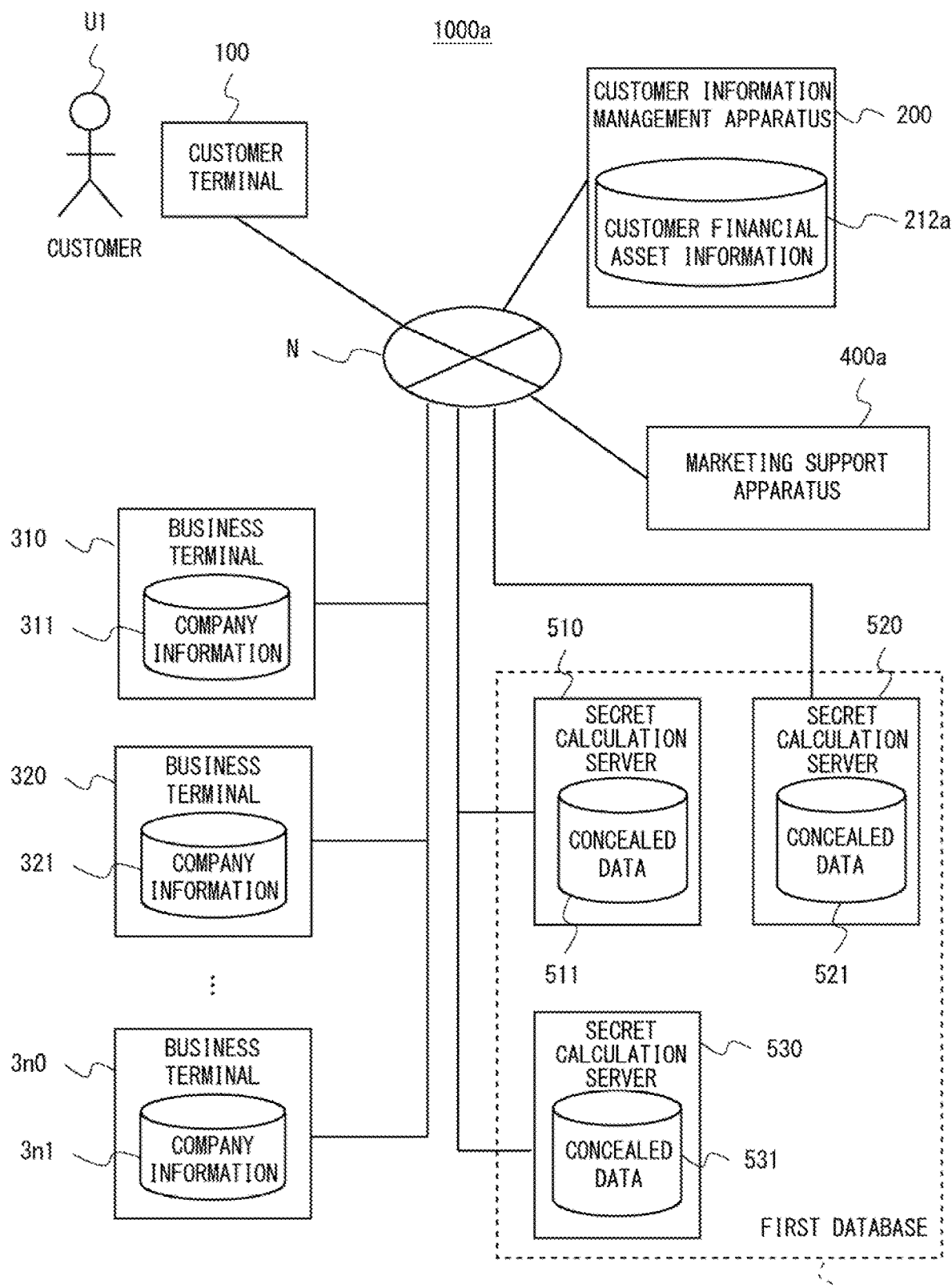
FIG. 8 is a block diagram illustrating an overall configuration of a marketing support system according to the third example embodiment.

FIG. 8 is a block diagram illustrating an overall configuration of a marketing support system 1000a according to the third example embodiment. The marketing support system 1000a includes a customer terminal 100, a customer information management apparatus 200, business terminals 310, 320, . . . , 3n0 (n is a natural number of 2 or more.), a marketing support apparatus 400a, and secret calculation servers 510, 520, and 530. Each of the customer terminal 100, the customer information management apparatus 200, the business terminal 310, 320, . . . , 3n0 (n is a natural number of 2 or more.), the marketing support apparatus 400a, and the secret calculation servers 510, 520, and 530 is connected via a network N. The customer information management apparatus 200 is a computer server operated by a customer information management organization that manages customer information including financial assets of a customer. The customer information management organization may be an organization that provides an aggregation service that aggregates and manages account information of a plurality of financial institutions of a specific customer. Alternatively, the customer information management organization may be a credit card company. Alternatively, the customer information management organization may be a financial institution. The customer information management apparatus 200 manages customer financial asset information 212a. The customer financial asset information 212a is an example of the customer information 212, and includes financial information of the customer and information about an affiliation destination (workplace or the like of a workplace). The other configurations of the customer information management apparatus 200 are the same as those of the second example embodiment, and thus, are not illustrated and described in detail.

The business terminals 310 to 3n0 are an example of the business terminal 300. It is assumed that each of the business terminals 310 to 3n0 belongs to a different business operator. Each business operator is, for example, a consumer financial company, a life insurance or non-life insurance company, a real estate agent, a real estate seller, a housing loan sales company, or the like. The business terminal 310 stores the company information 311, the business terminal 320 stores the company information 321, . . . and the business terminal 3n0 stores the company information 3n1. Each of the company information 311, 321, . . . , 3n1 is an example of a second database and is affiliation information corresponding to an affiliation destination. The company information 311 is information about a plurality of companies owned by the business operator to which the business terminal 310 belongs. For example, the company information 311 is information about an average annual income of employees in a plurality of companies for each age. In addition, the company information 311 includes a coefficient (company coefficient) used in the calculation logic for each company. The company information 321 to 3n1 are similar to the company information 311, but may include information about a company different from the company information 311. In addition, the company information 321 to 3n1 may include the same company as the company information 311 or may have different company coefficients. Each of the business terminal 310 and the like generates a scoring logic (calculation logic) of a potential customer based on its own know-how and transmits the calculation logic to the marketing support apparatus 400a via the network N. That is, the calculation logic is assumed to be different for each of the business terminal 310 and the like. Furthermore, the calculation logic may include the company information. For example, the business terminal 310 may generate a calculation logic including the content of the company information 311.

The secret calculation servers 510, 520 and 530 constitute a first database 500. Each of the secret calculation servers 510, 520, and 530 is a computer server including a database. Each of the secret calculation servers 510, 520, and 530 stores each of the concealed data 511, 521, and 531. Each of the concealed data 511, 521, and 531 is each data (divided data) obtained by overlapping and dividing a part of the customer financial asset information 212a, and is encrypted for each divided data. Alternatively, each of the concealed data 511, 521, and 531 is divided data obtained by dividing the value of one element data of the customer financial asset information 212a into a plurality of pieces, and is encrypted for each divided data. Therefore, even when the concealed data 511 is leaked alone, it cannot be restored to the original customer financial asset information 212a.

The secret calculation server 510 receives a registration request including the first divided data from the marketing support apparatus 400a, encrypts the received first divided data, and registers the divided data in an internal database as the concealed data 511. In addition, the secret calculation server 510 receives an acquisition request for the first element data that is a part of the first divided data from the marketing support apparatus 400a. Then, the secret calculation server 510 returns the concealed data corresponding to the first element data in the concealed data 511 to the marketing support apparatus 400a. That is, the first element data itself is not returned, and the concealed data encrypted is returned to the first element data. In addition, the secret calculation server 510 receives a predetermined operation request for the first element data from the marketing support apparatus 400a. Then, the secret calculation server 510 performs the requested operation using the portion corresponding to the first element data in the concealed data 511, and returns the first operation result to the marketing support apparatus 400a. That is, the first operation result does not include the first element data itself. Furthermore, the secret calculation server 510 may perform calculation in cooperation with the secret calculation servers 520 and 530 according to the content of the operation request. For example, in a case where data necessary for calculation is insufficient in the concealed data 511, the secret calculation server 510 may appropriately acquire necessary data from the secret calculation servers 520 and 530 and perform calculation using the concealed data 521, 531, and 511. Note that the secret calculation servers 520 and 530 have functions equivalent to those of the secret calculation server 510.

The marketing support apparatus 400a is an example of the marketing support apparatus 400 described above. The marketing support apparatus 400a divides the customer financial asset information 212a, and distributes and registers each divided data to each of the secret calculation servers 510 to 530. In addition, when performing an operation based on the calculation logic, the marketing support apparatus 400a extracts element data defined in the calculation logic, and transmits an operation request for each element data from the secret calculation server 510 to the secret calculation server 530 corresponding to the element data. Then, the marketing support apparatus 400a calculates a score based on the calculation logic using the first to third operation results acquired from the secret calculation server 510 to the secret calculation server 530. In the following description, the marketing support apparatus 400a may acquire some attribute values of the concealed data. However, the acquired attribute value is not decrypted, but encrypted, and is a part of the concealed data.

Figure 9:
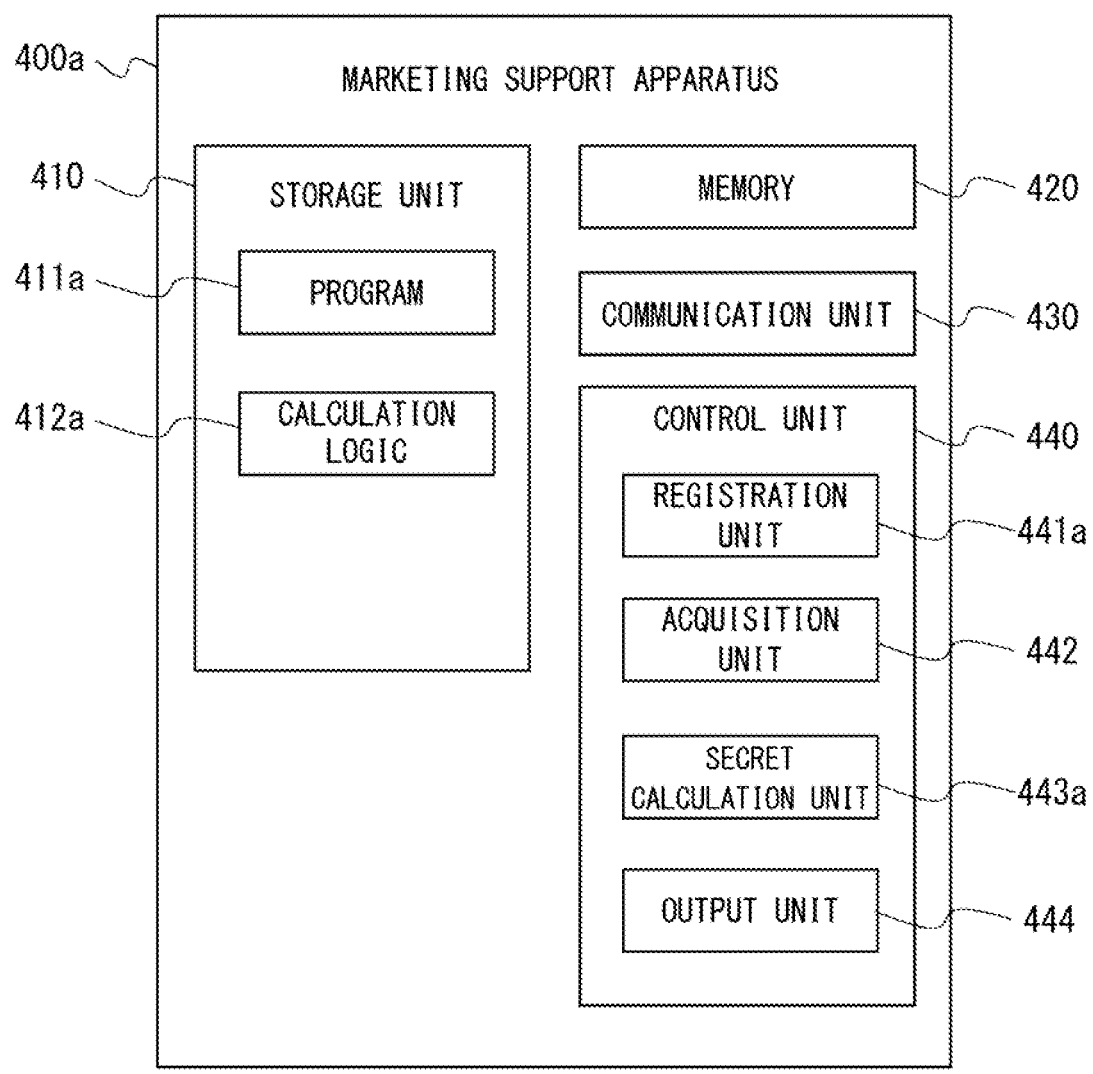
FIG. 9 is a block diagram illustrating a configuration of a marketing support apparatus according to the third example embodiment.

FIG. 9 is a block diagram illustrating a configuration of the marketing support apparatus 400a according to the third example embodiment. The marketing support apparatus 400a is different from the marketing support apparatus 400 described above in terms of a program 411a, a calculation logic 412a, a registration unit 441a, and a secret calculation unit 443a. As described above, the marketing support apparatus 400a does not store the concealed data. Other configurations of the marketing support apparatus 400a are equivalent to those of the marketing support apparatus 400. The program 411a is a computer program in which the processing of the marketing support apparatus 400a is implemented in the marketing support method according to the third example embodiment. The calculation logic 412a is, for example, definition information of an arithmetic expression defined by one or more operators and two or more operands. Then, the operand may include attributes of company information (affiliation information) regarding a company of the affiliation destination of the customer, in addition to attributes such as personal information, sensitive information, and financial information included in the customer financial asset information 212a. Furthermore, the calculation logic 412a may define the condition of the customer to be subjected to the score calculation. For example, the calculation logic 412a may be defined to include a threshold of an attribute value group included in the customer financial asset information 212a, and to cause a score to be calculated by a subsequent arithmetic expression in a case where the attribute value group is equal to or more than the threshold or less than the threshold. Furthermore, the calculation logic 412a may include contents such as the company information 311. For example, the calculation logic 412a includes processing of specifying a company coefficient and a company average annual income from (concealed data of) a workplace and an age based on the company information 311.

The registration unit 441a conceals the customer financial asset information 212a acquired from the customer information management apparatus 200. Specifically, the registration unit 441a divides the customer financial asset information 212a into first to third divided data. As one method, the registration unit 441a divides a plurality of pieces of element data of the customer financial asset information 212a in a partially overlapping manner to obtain first to third divided data. For example, when the customer financial asset information 212a includes A, B, and C, the first divided data is A and B, the second divided data is B and C, and the third divided data is A and C. Alternatively, as another method, the registration unit 441a divides each of the values of the element data of the customer financial asset information 212a into a plurality of pieces of the first to third divided data. For example, A=A1+A2+A3, B=B1+B2+B3, and C=C1+C2+C3. In this case, the first divided data may be A1, B1, and C1, the second divided data may be A2, B2, and C2, and the third divided data may be A3, B3, and C3. Then, the registration unit 441a transmits a registration request including the first divided data to the secret calculation server 510 via the network N. Furthermore, the registration unit 441a transmits a registration request including the second divided data to the secret calculation server 520 via the network N. Furthermore, the registration unit 441a transmits a registration request including the second divided data to the secret calculation server 530 via the network N. Note that these processes are an example of concealment.

The acquisition unit 442 receives different calculation logics from each of the business terminals 310 to 330 at an arbitrary timing, and registers the calculation logics as the calculation logics 412a in the storage unit 410.

The secret calculation unit 443a calculates a score from the concealed data 511 to 531 for each customer based on the calculation logic 412a. For example, the secret calculation unit 443a parses the calculation logic 412a to extract an operator and an operand (attribute of element data). Then, the secret calculation unit 443a specifies the attribute of the customer information indicated by the operand, and specifies one or more secret calculation servers storing the concealed data corresponding to the specified attribute. Then, the secret calculation unit 443a transmits a predetermined operation request for the element data to each of the specified secret calculation servers. The secret calculation unit 443a receives an operation result based on the operation request from each of the secret calculation servers. For example, the secret calculation unit 443a transmits an operation request to each of the secret calculation servers 510 to 530, and receives the first to third operation results from each of the secret calculation servers. Then, the secret calculation unit 443a performs an operation based on the calculation logic 412a using the first to third operation results to calculate a score.

Further, when the operand defined in the calculation logic 412a includes the attribute of the company information, the secret calculation unit 443a specifies the attribute value (element data) of the customer financial asset information 212a necessary for acquiring the attribute value of the company information. Then, the secret calculation unit 443a transmits an acquisition request of the specified attribute value to the secret calculation server. The secret calculation unit 443a acquires the attribute value from the secret calculation server. Note that, in a case where the secret calculation unit 443a acquires the divided data of the attribute value from the plurality of secret calculation servers, the respective pieces of divided data may be combined to be the attribute value. Then, the secret calculation unit 443a acquires the company information from the attribute value based on the contents of the company information 311 and the like defined in the calculation logic 412a. For example, the secret calculation unit 443a encrypts the company name and age from the content of the company information 311 included in the calculation logic 412a, and then matches the encrypted attribute value with the acquired (encrypted) attribute value to specify the corresponding company information (average annual income, company coefficient, and the like). Then, the secret calculation unit 443a performs calculation based on the calculation logic 412a using the company information and the first to third operation results described above, and calculates a score.

Furthermore, the operand defined in the calculation logic 412a may include a specific attribute that does not exist in the customer financial asset information 212a or the company information 311 to 331. For example, it is assumed that the customer financial asset information 212a includes a place of employment and an address (at least a municipality level) of the customer, and that an operand includes a commuting time as a specific attribute. In this case, the secret calculation unit 443a transmits the acquisition request of the place of employment and the address to the secret calculation servers 510 to 530. Then, the secret calculation unit 443a synthesizes a set of the place of employment and the address for each customer from the acquisition result from the secret calculation servers 510 to 530. Then, the secret calculation unit 443a calculates the commuting time for each customer by predetermined calculation from the restored set of the place of employment place and the address. Then, the secret calculation unit 443a performs an operation based on the calculation logic 412a by further using the calculated commuting time, and calculates a score.

Furthermore, in a case where the condition of the customer to be subjected to the score calculation described above is defined in the calculation logic 412a, the secret calculation unit 443a analyzes the calculation logic 412a and specifies an attribute value (element data) necessary for determination of the condition. Then, the secret calculation unit 443a transmits an acquisition request of the specified attribute value to the secret calculation server. The secret calculation unit 443a acquires the attribute value from the secret calculation server. Then, the secret calculation unit 443a determines whether or not the condition of the customer is satisfied from the acquired attribute value, and processes the subsequent arithmetic expression as described above when the condition is satisfied. Here, the secret calculation unit 443a performs the condition determination by comparing the acquired (encrypted) attribute value by encrypting the threshold of the condition determination.

The output unit 444 generates a score list from a set of the score calculated by the secret calculation unit 443a for each customer and the customer ID corresponding to the score, and transmits the score list to the customer information management apparatus 200. Note that the output unit 444 may transmit the score list to any one of the business terminals 310 to 330 that are the providers of the calculation logic 412a.

Here, as a specific application example of the third example embodiment, a sales contract of real estate or a housing loan will be described. First, the customer U1 is a residence purchase desiring person. In addition, the customer information management organization is a company that holds personal information of the residence purchase desiring person, and is, for example, a company that provides an aggregation service that aggregates and manages account information of a plurality of financial institutions owned by a specific individual. In addition, the business operator is a company or a financial institution that sells real estate or a housing loan, and is a business operator who desires to acquire customers of real estate or a housing loan.

Generally, the residence purchase desiring person requests a proposal that matches his/her wish or financial assets, but does not want to disclose personal information to a third party until the person accepts the proposal content. In addition, the business operator desires to improve productivity in selection of prospective customers and effectively utilize advertisement rates. Here, since the business operator accumulates scoring know-how of prospective customer selection through past operations, it is possible to extract a promising customer without directly holding customer data. However, since the scoring know-how is concealed information unique to the company, it is not desired to be known to a third party. Further, in accordance with the Personal Information Protection Act, a customer information management organization in Japan may not provide personal information (customer information) of a customer to a third party for any purpose other than the purpose. Meanwhile, the customer information management organization wants to support creation of new business opportunities by utilizing customer information. Therefore, the customer information management organization requires a third party to utilize customer information without leaking the customer information to the third party.

FIG. 10 is a diagram illustrating an example of the customer financial asset information 212a according to the third example embodiment. The customer financial asset information 212a includes, as attributes, a customer ID, an age, whether or not own house, family structure, years of residence, an address, a workplace, a place of employment, years of service, an annual income (ten thousand [yen]), and a deposit balance (ten thousand [yen]). The age may be a date of birth. Furthermore, the family structure may include gender, parent-child relationship, and the like. The address and the place of employment include, for example, a municipality level, and may be information that can calculate at least a commuting time. The workplace may be identification information of a company. The annual income and the deposit balance may be approximate values. The deposit balance is, for example, a total value of account balances of a plurality of financial institutions owned by the customer. FIG. 10 illustrates an example of three customer IDs "01", "02", and "03", but each attribute value is not limited thereto. Further, it is a matter of course that the customer financial asset information 212a may include information on four or more customers. Note that the customer financial asset information 212a may include a real estate evaluation value of the house for the customer having the owner's house.

FIG. 11 is a diagram illustrating an example of the company information 311 according to the third example embodiment. The company information 311 includes, as attributes, a company name, an average annual income for each age, and a company coefficient. The company name may be identification information of a company. The average annual income for each age may be information independently accumulated by a business operator or obtained from an external organization. The company coefficient is a value that is set independently based on a past transaction record of the business operator. Therefore, the average annual income for each age and the company coefficient may be different among the company information 311, 321, and 331 even for the same company.

Next, an example of a customer selection criteria of a certain business operator A will be described. It is assumed that the business operator A intends to create a business to sell a property owned by a family in the Tokyo area and a housing loan for the property. Conditions of a customer target of the business operator A are that the target age is 25 years old or more and 40 years old or less, married people (2 or more family members), and no owner's house. That is, the business operator A excludes customers over 40 years old from the target of customer selection in consideration of the repayment risk. In addition, the condition for the customer target of the business operator A is that the years of residence is three years or more. Then, the score serving as the customer selection criteria of the business operator A is calculated to be higher as the commuting time is shorter and higher as the years of service are longer. Furthermore, in the calculation of the score, the performance status of the workplace is considered. In addition, in the calculation of the score, the business operator A evaluates the salary information in light of an income curve of the workplace, and evaluates the financial asset information (deposit balance) as a repayment safety index. In addition, since the target customer is a young person to a middle aged person, the business operator A emphasizes an expected lifetime income of the workplace from the current salary and financial assets in the calculation of the score. However, in consideration of loan repayment safety, the business operator A also evaluates financial assets in the calculation of the score. The business operator A sets the company coefficient in consideration of the performance status of the workplace (company).

Here, an example of the calculation logic and the score of the business operator A will be described. Conditions of the customer to be subjected to score calculation in the calculation logic of the business operator A are that the customer does not own a house, the family structure is 2 or more, and the age is years old or younger. Therefore, in a case where the customer owns a house and the family structure is 1 person (unmarried) or the age is 41 or more, the score of the customer is calculated to be 0. A score calculation formula in a case where the condition of the customer is satisfied is, for example, as follows.

Score=company coefficient*(annual income/company average annual income)*(40−age)+deposit balance/1000+20*(years of residence−3)+300*family structure+10*years of service+50*(60−commuting time)

Then, in a case where the score is 5000 points or more, the business operator A is a proposal (approach) target. That is, the business terminal 310 sets the condition of the score of the proposal target person in Step S212 to 5000 points or more.

Here, when syntactically analyzing the score calculation formula (calculation logic 412a) of the business operator A, the secret calculation unit 443a first extracts whether own a house, a family structure, and an age as the condition of the customer. Then, the secret calculation unit 443a transmits an acquisition request of the house, the family structure, and the age of each customer to the secret calculation server 510 and the like. Then, the secret calculation unit 443a determines whether or not each customer is subject to score calculation from the received house, family structure, and age. That is, the secret calculation unit 443a determines whether or not the condition is satisfied for each customer.

Subsequently, the secret calculation unit 443a extracts the annual income, the age, the deposit balance, the years of residence, the family structure, and the years of service from the score calculation formula (calculation logic 412a) of the business operator A. Then, the secret calculation unit 443a transmits, to the secret calculation server 510 or the like, a request for acquiring the annual income, the age, the deposit balance, the years of residence, the family structure, and the years of service of the customer for which the score is to be calculated. Then, the secret calculation unit 443a receives the annual income, the age, the deposit balance, the years of residence, the family structure, and the years of service from the secret calculation server 510 or the like.

In addition, the secret calculation unit 443a extracts the company coefficient and the company average annual income from the score calculation formula (calculation logic 412a) of the business operator A. Then, the secret calculation unit 443a specifies the workplace and the age as the attribute values necessary for acquiring the company coefficient and the company average annual income, and transmits a request for acquiring the workplace and the age of the customer of the score calculation target to the secret calculation server 510 and the like. Then, the secret calculation unit 443a receives the workplace and the age from the secret calculation server 510 or the like. Then, the secret calculation unit 443a encrypts the company name and age from the content of the company information 311 included in the calculation logic 412a, and then specifies the company coefficient and the company average annual income associated with the received (encrypted) workplace (company name) and age.

Further, the secret calculation unit 443a extracts the commuting time from the score calculation formula (calculation logic 412a) of the business operator A. At this time, the secret calculation unit 443a transmits a request for acquiring the place of employment and the address to the secret calculation server 510 and the like. Then, the secret calculation unit 443a receives a set of the place of employment and the address from the secret calculation server 510 or the like. Then, the secret calculation unit 443a calculates the commuting time for each customer by a predetermined operation from a set of the place of employment and the address.

Note that, in the above description, in a case where the secret calculation unit 443a receives the operation result or the divided data from the secret calculation server 510 or the like, the secret calculation unit combines the operation results and the divided data to obtain the attribute value. That is, the secret calculation unit 443a may perform secret restoration of the age, whether or not own a house, the family structure, the years of residence, the address, the workplace, the place of employment, the years of service, the annual income, and the deposit balance (which have been encrypted) from the divided data distributed as a secret to the secret calculation server 510 or the like by the secret calculation.

Thereafter, the secret calculation unit 443a calculates the score for each customer by the secret calculation based on the score calculation formula using each attribute value, the company coefficient, the company average annual income, and the commuting time.

In the examples of FIGS. 10 and 11, the following scores are calculated for the customer IDs "01" to "03". Note that, in the following calculation example, a real value (decrypted value) of each attribute is used for easy understanding of the description, but in practice, a value encrypted by secret calculation may be used.

Score of customer ID"01"=100*(500/450)*(40−25)+ 1,000,000/1,000+20(3−3)+300*3+10*3+50*(60− 30)≈5097

Score for customer ID"02"=80*(700/700)*(40−35)+ 2,000,000/1,000+20*(5−3)+300*4+10*5+50* (60−50)=4190

Score of customer ID"02"=0 (because of age of 55)

Therefore, the customer ID "01" is a customer to be proposed by the business operator A, and the customer IDs "02" and "03" are customers not to be proposed by the business operator A.

Next, an example of the customer selection criteria of a certain business operator B will be described. It is assumed that the business operator B intends to create business to sell properties for older persons and housing loans for the properties. Conditions of the customer target of the business operator B are that the target age is 55 years old or more and 65 years old or less, and 2 family members or less, and evaluation is performed both with and without a house. That is, it is assumed that the business operator B aims to target elderly people who have finished raising children and introduce rehouses and suburban small properties. In addition, the condition for the customer target of the business operator B is that the years of residence is 20 years or more. Then, the business operator B evaluates the commuting time as reference information, and does not consider the years of service. Furthermore, in the calculation of the score, the performance status of the workplace is considered. In addition, in the calculation of the score, the business operator A evaluates the income until retirement particularly by comparing the salary information with the income curve of the workplace, emphasizes financial asset information (deposit balance), and also considers the real estate evaluation value when own a house. In addition, since the target customer is about to leave the company, the business operator B regards the workplace, the place of employment, and the salary information as reference information, and on the other hand, emphasizes financial assets, and increases the priority at the time of real estate holding. The business operator B sets the company coefficient in consideration of the performance status of the workplace (company).

Here, an example of the calculation logic and the score of the business operator B will be described. Conditions of the customer to be subjected to score calculation in the calculation logic of the business operator B are age of 55 or more and 65 or less, and 2 or less family members. Therefore, in a case where the age is 54 years old or less or the family structure is 3 or more, the score of the customer is calculated to be 0. A score calculation formula in a case where the condition of the customer is satisfied is, for example, as follows.

Score=company coefficient*(annual income/company average annual income)*(60−age)+(deposit balance+real estate evaluation value)/10,000+50* (years of residence−20)+300*family structure Then, in a case where the score is 5000 points or more, the business operator B is a proposal (approach) target. That is, the business terminal 320 of the business operator B sets the condition of the score of the proposal target person in Step S212 to 5000 points or more.

Here, the secret calculation unit 443a parses the score calculation formula (calculation logic 412a) of the business operator B. However, the subsequent score calculation processing by the secret calculation unit 443a is similar to the case of the business operator A. When the real estate evaluation value is included in the customer financial asset information 212a, the secret calculation unit 443a acquires the real estate evaluation value from the concealed data. In addition, in a case where the real estate evaluation value is not included in the customer financial asset information 212a, the secret calculation unit 443a may acquire the years of residence, the address, and the like from the concealed data, and calculate the real estate evaluation value by a predetermined arithmetic expression based on the years of residence, the address, and the like. Alternatively, the secret calculation unit 443a may transmit a request for calculating the real estate evaluation value including the years of residence, the address, and the like to the business terminal 310. In that case, in response to the operation request, the business terminal 310 may calculate the real estate evaluation value from the years of residence, the address, and the like by a calculation formula unique to the business operator, and return the real estate evaluation value to the marketing support apparatus 400a.

In the examples of FIGS. 10 and 11, the following scores are calculated for the customer IDs "01" to "03". Note that the real estate evaluation value of the customer ID "03" is 20 million yen. Note that, in the following calculation example, a real value (decrypted value) of each attribute is used for easy understanding of the description, but in practice, a value encrypted by secret calculation may be used.

Score of customer ID"01"=0 (because of age of 54 or less)

Score of customer ID"02"=0 (because of age of 54 or less)

Score for customer ID"03"=70*(300/300)*(60−55)+ (20,000,000+20,000,000)/10,000+50*(30−20)+ 300*2=5450

Therefore, the customer IDs "01" and "02" are customers not to be proposed by the business operator B, and the customer ID "03" is a customer to be proposed by the business operator B.

Note that other application examples of the present third example embodiment include, for example, refinancing of a housing loan and guidance of financial products. In that case, the customer information management organization is a company that provides an accounting application service online, and the business operator is a bank, a securities company, a housing loan provider company, or the like.

In the third example embodiment, the business operator can acquire a sales opportunity of a financial product without holding personal information or the like through a customer scoring service provided by the marketing support apparatus 400a. At the same time, the customer information management organization can improve the value of customer information including financial asset information held by the company by providing business opportunities to the business operator.

In the third example embodiment, similarly to the second example embodiment, the scoring calculation formula (calculation logic) suitable for the prospective customer layer is registered in the marketing support apparatus 400a, so that the proposal target customer can be efficiently filtered.

Other Example Embodiments

Note that, in the above-described example embodiments, the configuration of the hardware has been described, but the present invention is not limited thereto. The present disclosure can also be implemented by causing a CPU to execute a computer program.

In the above example, the program may be stored using various types of non-transitory computer readable media and supplied to a computer. Non-transitory computer readable media include various types of tangible storage media. Examples of the non-transitory computer readable medium include a magnetic recording medium (For example, a flexible disk, a magnetic tape, or a hard disk drive), a magneto-optical recording medium (for example, a magneto-optical disk), a CD-ROM (Read Only Memory), a CD-R, a CD-R/W, a DVD (Digital Versatile Disc), and a semiconductor memory (For example, mask ROM, PROM (Programmable ROM), EPROM (Erasable PROM), flash ROM, and RAM (Random Access Memory)). In addition, the program may be supplied to the computer by various types of transitory computer readable media. Examples of transitory computer readable media include electrical signals, optical signals, and electromagnetic waves. The transitory computer readable media can supply programs to computers via wired or wireless communication paths, such as wires and optical fiber.

Note that the present disclosure is not limited to the above example embodiments, and can be appropriately changed without departing from the gist. Furthermore, the present disclosure may be implemented by appropriately combining the respective example embodiments.

Some or all of the above example embodiments may be described as the following supplementary notes, but are not limited to the following.

(Supplementary Note A1)

A marketing support apparatus including:
a registration means for registering, in a first database, concealed data obtained by concealing customer information acquired from a customer information management apparatus;
an acquisition means for acquiring, from a predetermined business operator, a calculation logic for calculating an evaluation value indicating a degree of a potential customer based on the customer information;
a calculation means for calculating the evaluation value from the concealed data using the calculation logic; and
an output means for outputting output information based on the evaluation value.

(Supplementary Note A2)

The marketing support apparatus according to Supplementary Note A1, wherein the output means outputs a set of the evaluation value and customer identification information corresponding to the evaluation value as the output information.

(Supplementary Note A3)

The marketing support apparatus according to Supplementary Note A1, wherein the output means outputs distribution information of the evaluation values of a plurality of customers as the output information.

(Supplementary Note A4)

The marketing support apparatus according to any one of Supplementary Notes A1 to A3, wherein the output means outputs the output information to the customer information management apparatus.

(Supplementary Note A5)

The marketing support apparatus according to any one of Supplementary Notes A1 to A3, wherein the output means outputs the output information to the business operator.

(Supplementary Note A6)

The marketing support apparatus according to any one of Supplementary Notes A1 to A5, wherein the calculation means calculates the evaluation value from the concealed data by secret calculation.

(Supplementary Note A7)

The marketing support apparatus according to any one of Supplementary Notes A1 to A6, wherein the customer information includes financial information and an affiliation destination of a customer,
the calculation logic includes the financial information and affiliation information regarding the affiliation destination, and the calculation means
specifies the affiliation destination and the financial information included in the customer information from the concealed data,
specifies the affiliation information corresponding to the specified affiliation destination from the calculation logic, and
calculates the evaluation value using the specified financial information and the acquired affiliation information.

(Supplementary Note B1)

A marketing support system including:
a customer information management apparatus configured to manage customer information; and
a marketing support apparatus,
wherein the marketing support apparatus includes
a registration means for registering, in a first database, concealed data obtained by concealing the customer information acquired from the customer information management apparatus,
an acquisition means for acquiring, from a predetermined business operator, a calculation logic for calculating an evaluation value indicating a degree of a potential customer based on the customer information,
a calculation means for calculating the evaluation value from the concealed data using the calculation logic, and
an output means for outputting output information based on the evaluation value.

(Supplementary Note B2)

The marketing support system according to Supplementary Note B1, wherein the customer information management apparatus
receives the output information from the marketing support apparatus,
receives a proposal content and a condition of the evaluation value of a proposal target person from the business operator,
specifies a contact address of a customer who is the proposal target person from the customer information based on a condition of the output information and the evaluation value, and
transmits the proposal content to the specified contact address.

(Supplementary Note B3)

The marketing support system according to Supplementary Note B2, wherein when acceptance of the proposal content is received from the customer who is a transmission destination of the proposal content, the customer information management apparatus transmits the acceptance and the customer information corresponding to the customer to the business operator.

(Supplementary Note C1)

A marketing support method causes a computer to execute:
acquiring customer information from a customer information management apparatus;
registering, in a first database, concealed data obtained by concealing the acquired customer information;
acquiring, from a predetermined business operator, a calculation logic for calculating an evaluation value indicating a degree of a potential customer based on the customer information;
calculating the evaluation value from the concealed data using the calculation logic; and
outputting output information based on the evaluation value.

(Supplementary Note D1)

A non-transitory computer readable medium storing a program for causing a computer to execute:
an acquisition process of acquiring customer information from a customer information management apparatus;
a registration process of registering, in a first database, concealed data obtained by concealing the acquired customer information;
an acquisition process of acquiring, from a predetermined business operator, a calculation logic for calculating an evaluation value indicating a degree of a potential customer based on the customer information;
a calculation process of calculating an evaluation value from the concealed data using the calculation logic; and
an output process of outputting output information based on the evaluation value.

Although the present invention has been described with reference to the example embodiments (and examples), the present invention is not limited to the above example embodiments (and examples). Various modifications that can be understood by those skilled in the art can be made to the configuration and details of the present invention within the scope of the present invention.

REFERENCE SIGNS LIST

1 MARKETING SUPPORT APPARATUS
11 REGISTRATION UNIT
12 ACQUISITION UNIT
13 CALCULATION UNIT
14 OUTPUT UNIT
1000 MARKETING SUPPORT SYSTEM
100 CUSTOMER TERMINAL
200 CUSTOMER INFORMATION MANAGEMENT APPARATUS
210 STORAGE UNIT
211 PROGRAM
212 CUSTOMER INFORMATION
213 SCORE LIST
2131 CUSTOMER ID
2132 SCORE
220 MEMORY
230 COMMUNICATION UNIT
240 CONTROL UNIT
241 REGISTRATION UNIT
242 SCORE RECEPTION UNIT
243 MEDIATION UNIT
300 BUSINESS TERMINAL
400 MARKETING SUPPORT APPARATUS
410 STORAGE UNIT
411 PROGRAM
412 CALCULATION LOGIC
413 CONCEALED DATA
420 MEMORY
430 COMMUNICATION UNIT
440 CONTROL UNIT
441 REGISTRATION UNIT
442 ACQUISITION UNIT
443 CALCULATION UNIT
444 OUTPUT UNIT
U1 CUSTOMER
N NETWORK
1000a MARKETING SUPPORT SYSTEM
200a FINANCIAL INSTITUTION SERVER
212a CUSTOMER FINANCIAL ASSET INFORMATION
310 BUSINESS TERMINAL

311 COMPANY INFORMATION
320 BUSINESS TERMINAL
321 COMPANY INFORMATION
3n0 BUSINESS TERMINAL
3n1 COMPANY INFORMATION
400a MARKETING SUPPORT APPARATUS
411a PROGRAM
412a CALCULATION LOGIC
441a REGISTRATION UNIT
443a SECRET CALCULATION UNIT
500 FIRST DATABASE
510 SECRET CALCULATION SERVER
511 CONCEALED DATA
520 SECRET CALCULATION SERVER
521 CONCEALED DATA
530 SECRET CALCULATION SERVER
531 CONCEALED DATA

What is claimed is:

1. A marketing support system comprising:
a customer information management apparatus configured to manage customer information of a plurality of users;
a marketing support apparatus; and
a plurality of secret calculation servers,
wherein the marketing support apparatus includes a first memory storing first instructions, and a first processor configured to execute the first instructions to:
acquire the customer information from the customer information management apparatus, wherein the customer information is element data having an attribute value;
divide the element data into a plurality of pieces of concealed data that include a plurality of customer IDs which are respectively associated with the plurality of users such that privacy of the plurality of users is maintained; and
distribute the plurality of pieces of concealed data to the plurality of secret calculation servers, wherein the plurality of pieces of concealed data regarding each user is distributed to more than one of the secrete calculation servers, such that the customer information of any user is not discernible from just the piece or pieces of concealed data regarding the any user distributed to any one of the secret calculation servers,
wherein each secret calculation server includes a third memory storing third instructions, and a third processor configured to execute the third instructions to:
receive a respective piece of concealed data from the marketing support apparatus; and
register, in first database, the respective piece of concealed data,
wherein the first processor of the marketing support apparatus is configured to execute the first instructions to further:
acquire, from a business operator, a calculation logic for calculating, based on the customer information of a given user, a score indicating a degree to which the given user is a potential customer of the business operator, the calculation logic specifying the attribute value of the element data for the given user that is the potential customer of the business operator; and
transmit a request to each secret calculation server to perform an operation based on the respective piece of concealed data thereof,
wherein the third processor of each secret calculation server is configured to execute the third instructions to further:
receive the request from the marketing support apparatus;
perform the operation on the respective piece of concealed data thereof; and
transmit an operation result to the marketing support apparatus,
wherein the first processor of the marketing support apparatus is configured to execute the first instructions to further:
receive the operation result from each secret calculation server;
respectively calculate, using the calculation logic, a plurality of scores for the plurality of users, based on the operation result received from each secret calculation server;
combine the operation result received from each secret calculation server to generate the attribute value of the element data specified by the calculation logic that is for each of the plurality of users as the given user that is the potential customer of the business operator, and includes the customer ID of each of the plurality of users;
generate a list of the scores, each score indicating the degree to which a corresponding user is the potential customer of the business operator and associated with the customer ID of the corresponding user in the list; and
output the list of the scores to the customer information management apparatus, and
wherein the customer information management apparatus includes a second memory storing second instructions and a second processor configured to execute the second instructions to:
receive the list of the scores, including the customer IDs to which the scores are respectively associated, from the marketing support apparatus;
receive a proposal content and a score condition from the business operator, the score condition specifying how to identify a proposal target person of the proposal content based on the scores;
determine one of the plurality of users is to be the proposal target person, by identifying the score satisfying the score condition, the customer ID associated with the score satisfying the score condition, and the user associated with the customer ID associated with the score satisfying the score condition;
specify a contact address of the user associated with the customer ID associated with the score satisfying the score condition, as a contact address of the proposal target person; and
transmit the proposal content to the specified contact address of the proposal target person,
wherein the proposal content received from the business operator is provided to the proposal target person without the business operator receiving the customer information of the proposal target person from the marketing support apparatus, such that privacy of the plurality of the users is maintained.

2. The marketing support system according to claim 1, wherein when acceptance of the proposal content is received from the proposal target person, the customer information management apparatus transmits the acceptance and the customer information corresponding to the proposal target person to the business operator.

3. The marketing support system according to claim 1, wherein a first portion of the element data included in a first piece of the plurality of pieces of concealed data overlaps with a second portion of the element data included in a second piece of the plurality of pieces of concealed data.

4. The marketing support system according to claim 3, wherein a third portion of the element data included in the first piece of the plurality of pieces of concealed data is different from a fourth portion of the element data included in the second piece of the plurality of pieces of concealed data.

* * * * *